United States Patent
Overall et al.

(10) Patent No.: US 6,238,037 B1
(45) Date of Patent: May 29, 2001

(54) METHOD OF MULTI-DOT INTERLACE PRINTING

(75) Inventors: Gary Scott Overall; Bryan Scott Willett, both of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/499,548

(22) Filed: Feb. 7, 2000

(51) Int. Cl.$^7$ ............................... B41J 2/145; B41J 2/15; B41J 29/38
(52) U.S. Cl. ................................. 347/41; 347/14
(58) Field of Search .................. 347/41, 14, 19; 358/298

(56) References Cited

U.S. PATENT DOCUMENTS

| | | |
|---|---|---|
| 4,063,254 | 12/1977 | Fox et al. . |
| 4,198,642 | 4/1980 | Gamblin . |
| 4,272,771 | 6/1981 | Furukawa . |
| 4,967,203 | 10/1990 | Doan et al. . |
| 4,999,646 | 3/1991 | Trask . |
| 5,059,984 | 10/1991 | Moore et al. . |
| 5,070,345 | 12/1991 | Lahut et al. . |
| 5,079,571 | 1/1992 | Eriksen . |
| 5,239,312 | 8/1993 | Merna et al. . |
| 5,359,355 | 10/1994 | Nagoshi et al. . |
| 5,450,111 | 9/1995 | Mutoh . |
| 5,485,183 | 1/1996 | Zandian et al. . |
| 5,555,006 * | 9/1996 | Cleveland et al. ............. 347/41 |
| 5,600,353 | 2/1997 | Hickman et al. . |
| 5,625,389 | 4/1997 | Eriksen et al. . |
| 5,625,391 | 4/1997 | Hirabayashi et al. . |
| 5,640,183 | 6/1997 | Hackleman . |
| 5,719,601 | 2/1998 | Moore et al. . |
| 5,734,393 | 3/1998 | Eriksen . |
| 5,777,640 | 7/1998 | Shioya et al. . |
| 5,790,141 | 8/1998 | Yamamoto . |
| 5,790,150 | 8/1998 | Lidke et al. . |
| 5,870,535 | 2/1999 | Duffin et al. . |
| 6,019,454 * | 2/2000 | Serra et al. .................. 347/41 |
| 6,082,849 * | 7/2000 | Chang et al. ................. 347/43 |

* cited by examiner

Primary Examiner—Thinh Nguyen
(74) Attorney, Agent, or Firm—Todd T. Taylor, Esq.; D. Brent Lambert, Esq.

(57) ABSTRACT

A method of performing interlace printing on a print medium with a printhead of an ink jet printer includes providing an array of pixel locations on the print medium. Each pixel location has a common maximum number M of ink drops that the pixel location may receive. Each pixel location is assigned a respective desired number D of ink drops which are to be placed at the pixel location. Each desired number D is less than or equal to M. Sets of threshold values are created. A number N of the sets of threshold values is equal to or greater than M. Each of the pixel locations corresponds to one of the threshold values of each set of threshold values. A respective, single ink drop is selectively jetted at each pixel location. Whether the single ink drop is jetted onto a respective pixel location is dependent upon the desired number D assigned to the respective pixel location and the corresponding threshold value of one of the sets of threshold values. The selectively jetting step is repeated N−1 additional times. Each selectively jetting step uses a different one of the sets of threshold values.

16 Claims, 18 Drawing Sheets

| 1 | 0 | 1 | 0 | 1 | 0 | 1 | 0 | 1 | 0 | 1 | 0 |
|---|---|---|---|---|---|---|---|---|---|---|---|
| 0 | 1 | 0 | 1 | 0 | 1 | 0 | 1 | 0 | 1 | 0 | 1 |
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |
| 1 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 |

PRIOR ART

Bits which match first pass mask are printed

Swath 1

Third Swath

Fourth Pass Mask

Fourth Swath

Fig. 5D

First Pass Mask

First Swath

Fig. 6A

Fourth Pass Mask

Fourth Swath

Fig. 6D

| SHINGLE MASK VALUES | | | | PMAP VALUES |
|---|---|---|---|---|
| 0 | 1 | 2 | 3 and greater | |
| 0 | 0 | 0 | 0 | 0 |
| 1 | 0 | 0 | 0 | 1 |
| 1 | 1 | 0 | 0 | 2 |
| 1 | 1 | 1 | 0 | 3 |
| Print PMAPs >0 | Print PMAPs >1 | Print PMAPs >2 | Never print | |

Table 1: "Greater Than" Lookup Table

Fig. 7

| SHINGLE MASK VALUES | | | | PMAP VALUES |
|---|---|---|---|---|
| 0 | 1 | 2 | 3 | |
| 0 | 0 | 0 | 0 | 0 |
| 0 | 0 | 0 | 1 | 1 |
| 0 | 0 | 1 | 1 | 2 |
| 0 | 1 | 1 | 1 | 3 |
| Never print | Print PMAPs >2 | Print PMAPs >1 | Print PMAPs >0 | |

Table 2: Alternate Table

Fig. 8

METHOD OF MULTI-DOT INTERLACE PRINTING

BACKGROUND OF THE INVENTION

1. Field of the Invention

The present invention relates to ink jet printers, and, more particularly, to a method of printing multiple drops of ink at any pixel location with an ink jet printer.

2. Description of the Related Art

With printers which use a columnar array of print elements or nozzles, a typical mode of operation requires that the column of nozzles be swept horizontally across the paper while the nozzles are selectively fired at points in the bitmap which represent printed pixels. At the end of such a swath, the paper is indexed vertically by the height of the printhead and the printhead is again swiped across the paper. With this process, there are inherent print defects introduced by such things as paper feed inaccuracies and nozzle-to-nozzle variations in drop size or placement. Two swaths of a solid-fill pattern produced by a printhead with twelve nozzles or print elements are shown in FIG. 1A. A ½-pel positive index overshoot results in a print artifact in the form of a visible light band in the print.

It is known to interlace the swaths as shown in FIG. 1B in order to minimize the visible effects of the overshoot. In the first swath of the printhead, a mask is applied to the printed data allowing ½ of the possible pels to be printed. In this case the mask applied is a checkerboard. After printing the first swath, the paper is indexed ½ of the head height and a complement of the previous mask is applied. This second swath completes the application of the pels for the bottom half of the first swath and applies a new set of 50%-fill pels for the bottom half of the second swath. This process is repeated for the rest of the page with half of the pels for any swath masked and indexes reduced to ½ of the head height. This is an example of two-pass binary interlacing or shingling.

As is apparent, the visible effect of the index error caused by the ½ pel index overshoot between every ½ head-height index is significantly reduced.

A deviant dot shape in a single nozzle can also cause a print artifact in the form of a band in the print, as can be seen in a comparison of FIGS. 2A and 2B. The printed results with this type of head fault when two-pass shingling and four-pass shingling are applied are shown in FIGS. 2C and 2D, respectively. As is apparent with higher shingling ratios, the deviant nozzle's effect is averaged throughout the printed pattern, producing a less noticeable artifact.

The use of binary shingling to produce a desired image is shown in FIGS. 3A through 3D. A shingling mask (FIG. 3A) of checkerboard 1's and 0's is laid over a bitmap of desired dots to be printed, and a twelve nozzle-high printhead (not shown) is passed over the bitmap. On the first swath (FIG. 3B), the bottom half of the head (the bottom six nozzles) is passed over the bitmap and every desired pixel that matches a 1 in the shingle mask is printed. As the paper is indexed by ½ of the head height (six nozzles), the shingle mask is complemented and, again, the matching bits are printed (FIG. 3C). The process is repeated (FIG. 3D) until the page is complete. This is termed "two-pass shingling" since two indexes each spanning six nozzles are required to move the paper by the equivalent of the head height of twelve nozzles.

In binary shingling, there are several variations on the algorithms. For example, the number of passes can be increased while decreasing the density of 1's in the mask. Another variation is to keep the mask for the entire head constant but divide the head into sections each with different masks. Primarily, the concept involves comparing a mask against the desired print pattern and altering the masks on each swath such that all portions of the page receive enough masks to allow all pels to be printed. For example, if 16-pass shingling is desired, the masks would have a density of ¹⁄₁₆ 1's and there would be 16 masks. This allows all locations to see a mask value of "1" a single time.

The known methods of shingling are used with printers which place, at most, one dot in every pixel location. On these uni-layer printers, the dot size must be large enough to allow full saturation fill if a single dot is placed on every grid location. At 600 dpi, the required dot size to meet this requirement is large enough to be distinctly visible. However, it is desirable to produce images and fill patterns that do not have visually discernable dots. A printer may be designed such that the individual dot-size is reduced to produce a less-noticeable single dot. With such a small drop-size, full saturation fills are not possible with a single layer of drops. Thus, the printer must place multiple drops in at least some of the pixel locations. Further, the printer must use a bitmap of pels that specifies the drop-count at every pixel location, not simply the existence of a drop.

If, for example, a maximum of two ink drops were required at each pixel location, it would not be appropriate, in two-pass mode, to fire all drops of the first layer on the first pass and all drops of the second layer on the second pass. In areas with slightly greater than 50% fill, there may be only a few drops on the second layer while the first layer is fully utilized. This would create an imbalance of printed dots per swath, which would result in undesirable print artifacts, as discussed above. Thus, with multidot bitmaps too, it would be advantageous to use masking or shingling to reduce the conspicuousness of print artifacts.

With the advent of multidot bitmaps, however, it is no longer possible to simply apply a binary mask over the print bitmap. The print bitmap now includes encoded values for each pixel location. These values represent the desired number of drops to be printed at each location.

What is needed in the art is a method of interleaving or shingling which may be used with a multidot bitmap.

SUMMARY OF THE INVENTION

The present invention provides a method of interlace printing which accommodates bitmaps that require multiple ink drops to be placed at at least one pixel location.

The invention comprises, in one form thereof, a method of performing interlace printing on a print medium with a printhead of an ink jet printer. An array of pixel locations is provided on the print medium. Each pixel location has a common maximum number M of ink drops that the pixel location may receive. Each pixel location is assigned a respective desired number D of ink drops which are to be placed at the pixel location. Each desired number D is less than or equal to M. Sets of threshold values are created. A number N of the sets of threshold values is equal to or greater than M. Each of the pixel locations corresponds to one of the threshold values of each set of threshold values. A respective, single ink drop is selectively jetted at each pixel location. Whether the single ink drop is jetted onto a respective pixel location is dependent upon the desired number D assigned to the respective pixel location and the corresponding threshold value of one of the sets of threshold values. The selectively jetting step is repeated N−1 additional times. Each selectively jetting step uses a different one of the sets of threshold values.

An advantage of the present invention is that shingling can be performed with any number of ink drops being placed at any pixel location.

Another advantage is that shingling can be performed with various numbers of passes of the printhead over a given pixel location. Yet another advantage is that the method is simple enough to be implemented in code or hardware.

A further advantage is that the drops are evenly distributed across all of the swaths that make up a printed area For example, in four-pass shingling with a single layer of drops required over an area, the masks applied allow 25% of the pixel locations to be fired on each pass; if two layers of drops are required across an area in four-pass mode, half of the pixels on each layer are allowed to fire on each pass; and if four layers of drops are required in an area in four-pass mode, all pixels are allowed to fire on each pass.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4A illustrates a first swath of one embodiment of the printing method of the present invention;

FIG. 4B illustrates a second swath of the printing method of FIG. 4A;

FIG. 4C illustrates a third swath of the printing method of FIG. 4A;

FIG. 5D illustrates a fourth swath of the printing method of FIG. 5A;

FIG. 6A illustrates a first swath of yet another embodiment of the printing method of the present invention;

FIG. 6D illustrates a fourth swath of the printing method of FIG. 6A;

FIG. 7 illustrates one embodiment of a lookup table which can be used in the embodiment of FIGS. 5A through 5D; and FIG. 8 illustrates another embodiment of a lookup table which may be used in the method of the present invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1A:
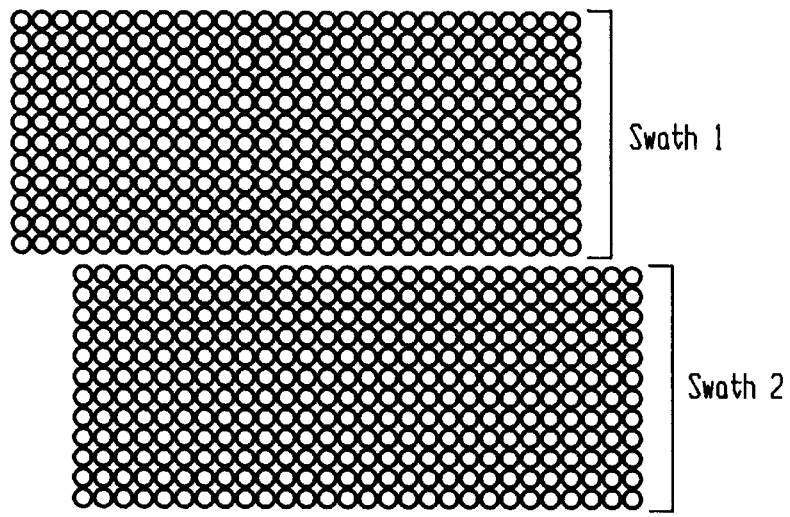
FIG. 1A illustrates the results of a prior art method of printing with a ½ pel index overshot between swaths.
Figure 1B:
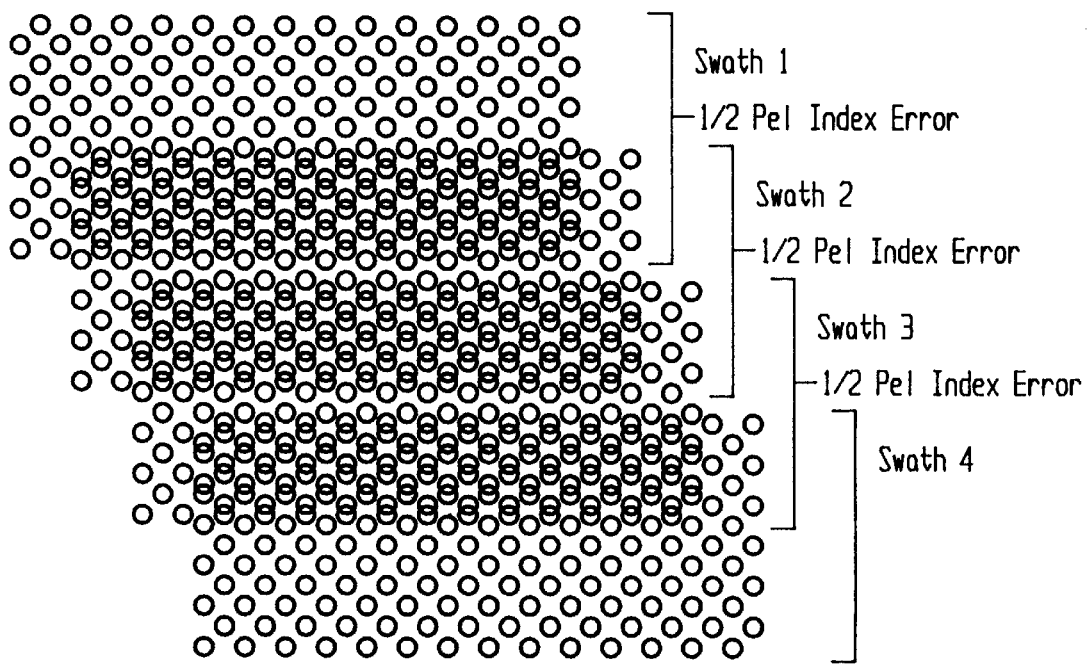
FIG. 1B illustrates the results of a prior art method of interlace printing with a ½ pel index overshoot between swaths.
Figure 2A:
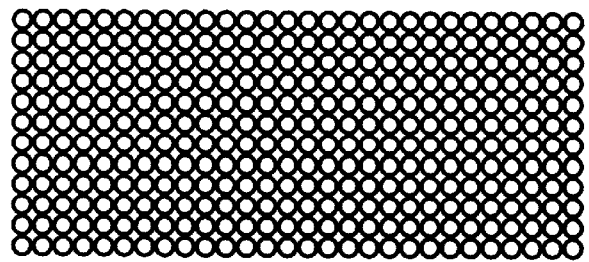
FIG. 2A illustrates one swath of a prior art method of printing with twelve good nozzles.
Figure 2B:
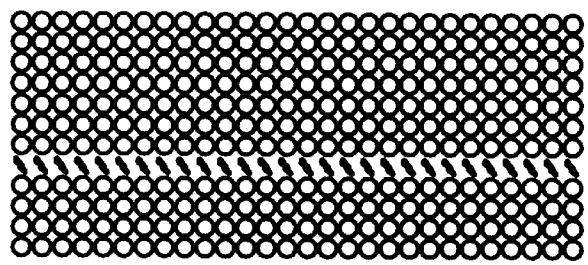
FIG. 2B illustrates one swath of a prior art method of printing with one bad nozzle.
Figure 2C:
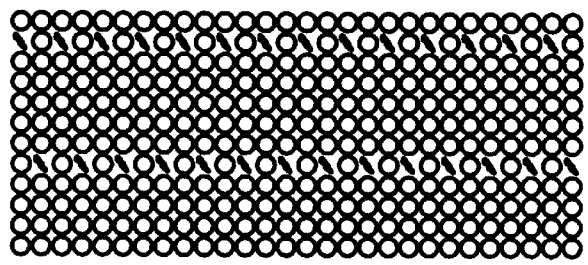
FIG. 2C illustrates a prior art method of printing with 50% shingling and one bad nozzle.
Figure 2D:
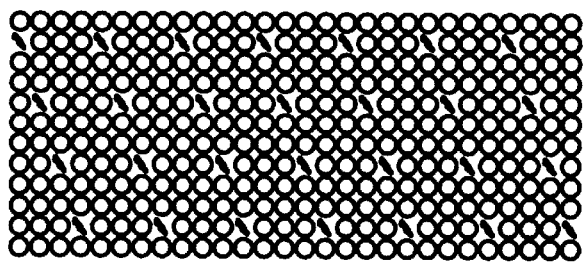
FIG. 2D illustrates a prior art method of printing with 25% shingling and one bad nozzle.
Figure 3A:
FIG. 3A illustrates one embodiment of a binary threshold value mask which may be used in a prior art print method.
Figure 3B:
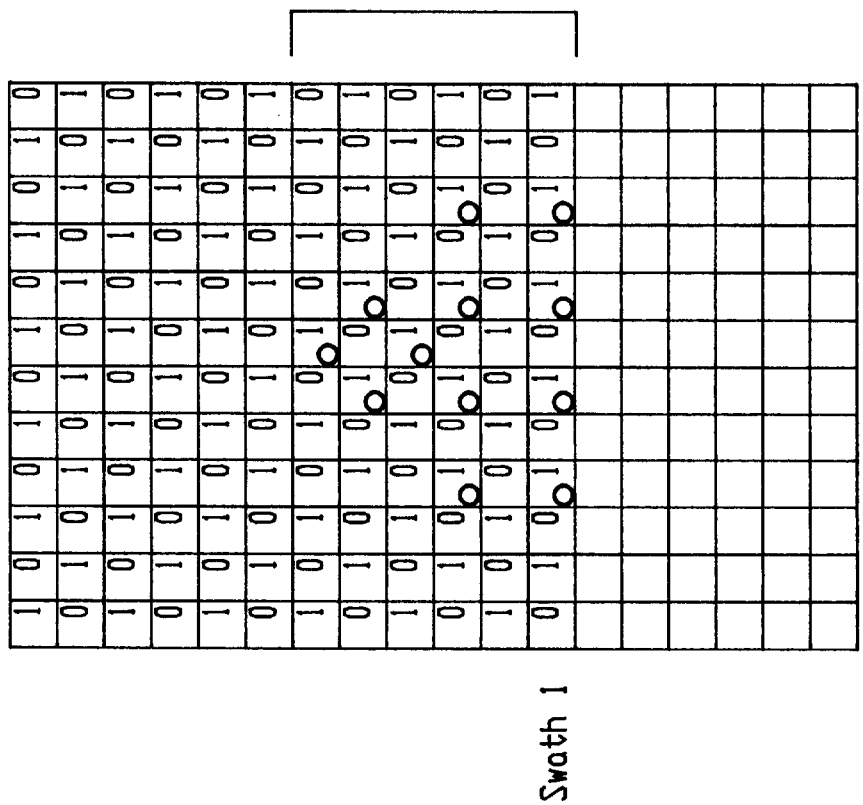
FIG. 3B illustrates one swath of a prior art printing method, using the mask of FIG. 3A.
Figure 3B:
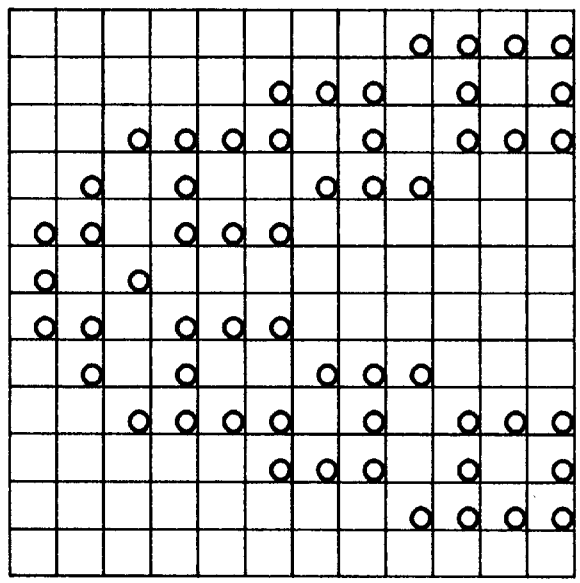
Figure 3C:
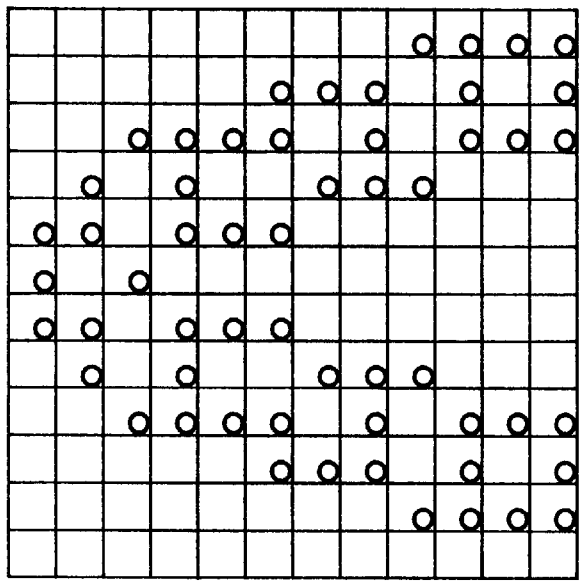
FIG. 3C illustrates the second swath of the prior art printing method of FIG. 3B, which uses a mask that is the complement of the mask of FIG. 3A.
Figure 3D:
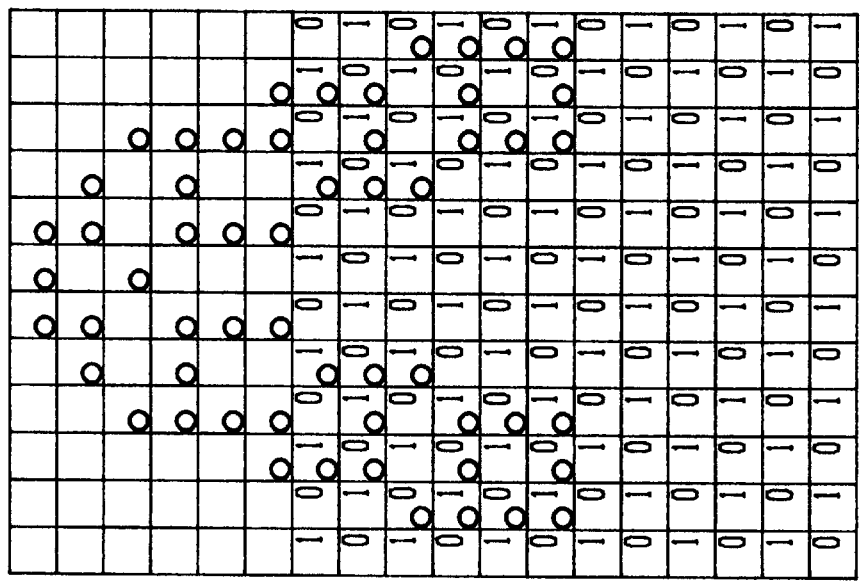
FIG. 3D illustrates the third swath of the prior art printing method of FIGS. 3B and 3C, using the mask of FIG. 3A.
Figure 3D:
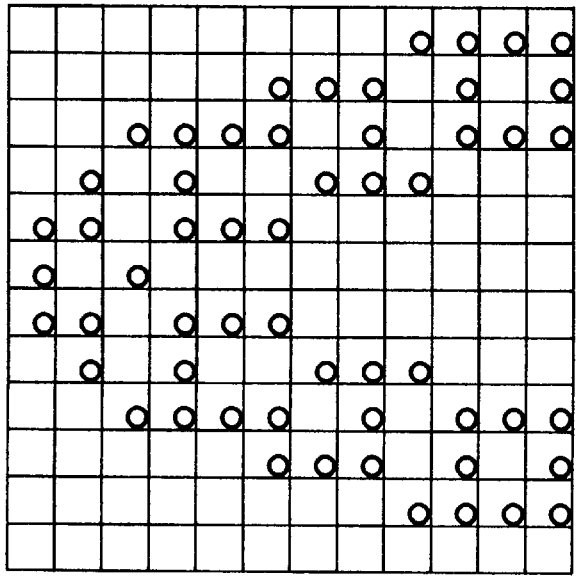
Figure 4A:
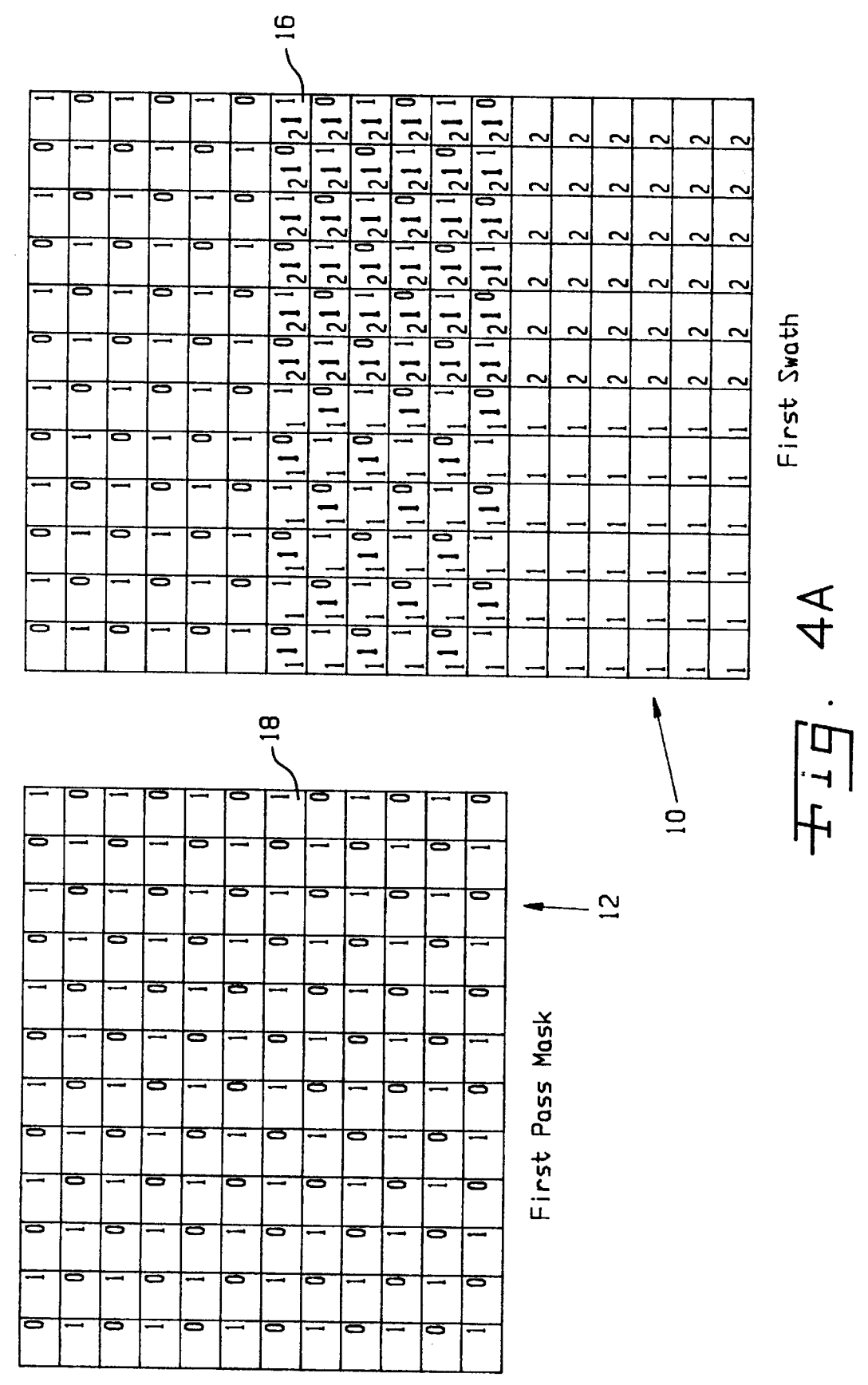
Figure 4B:
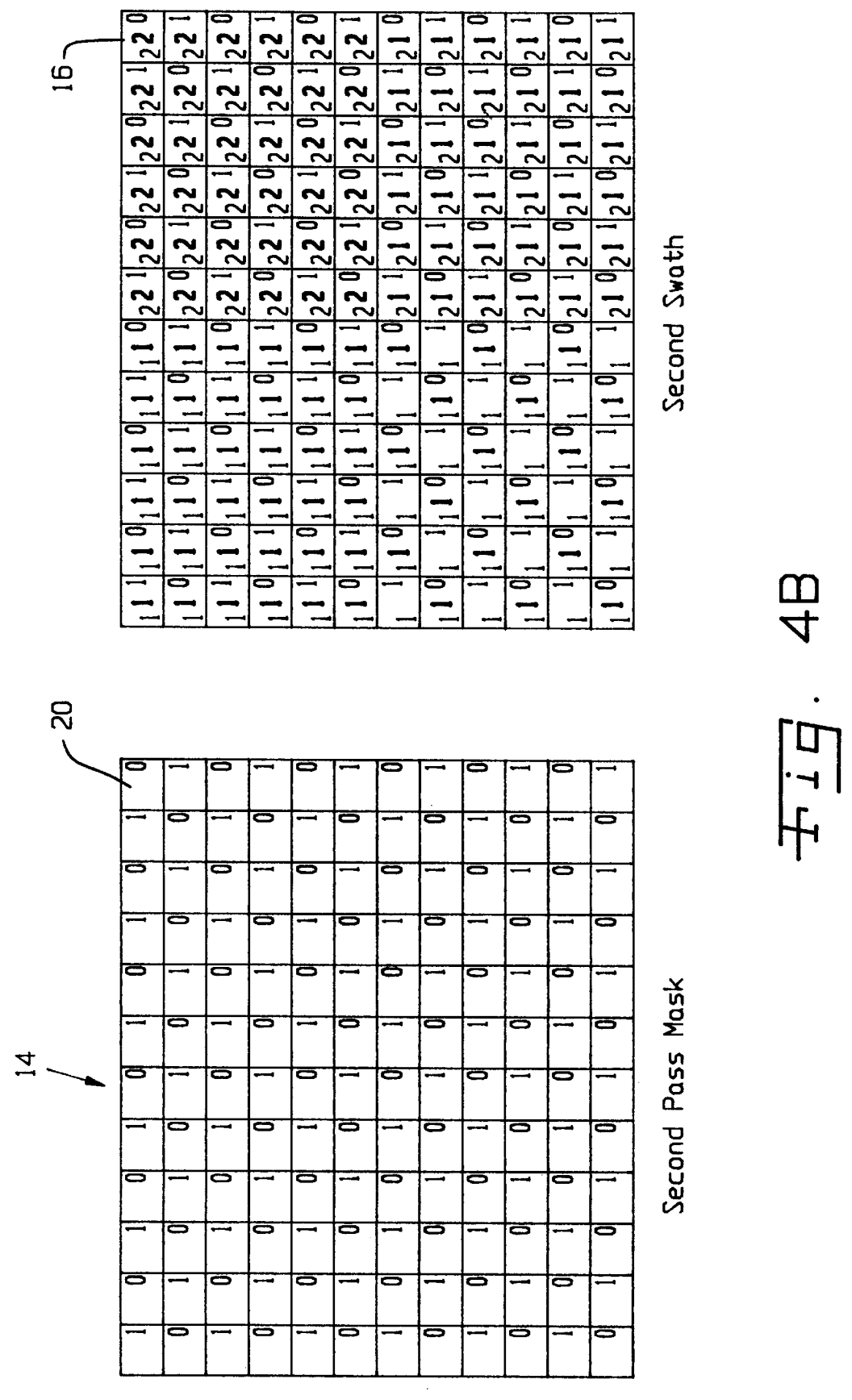
Figure 4C:
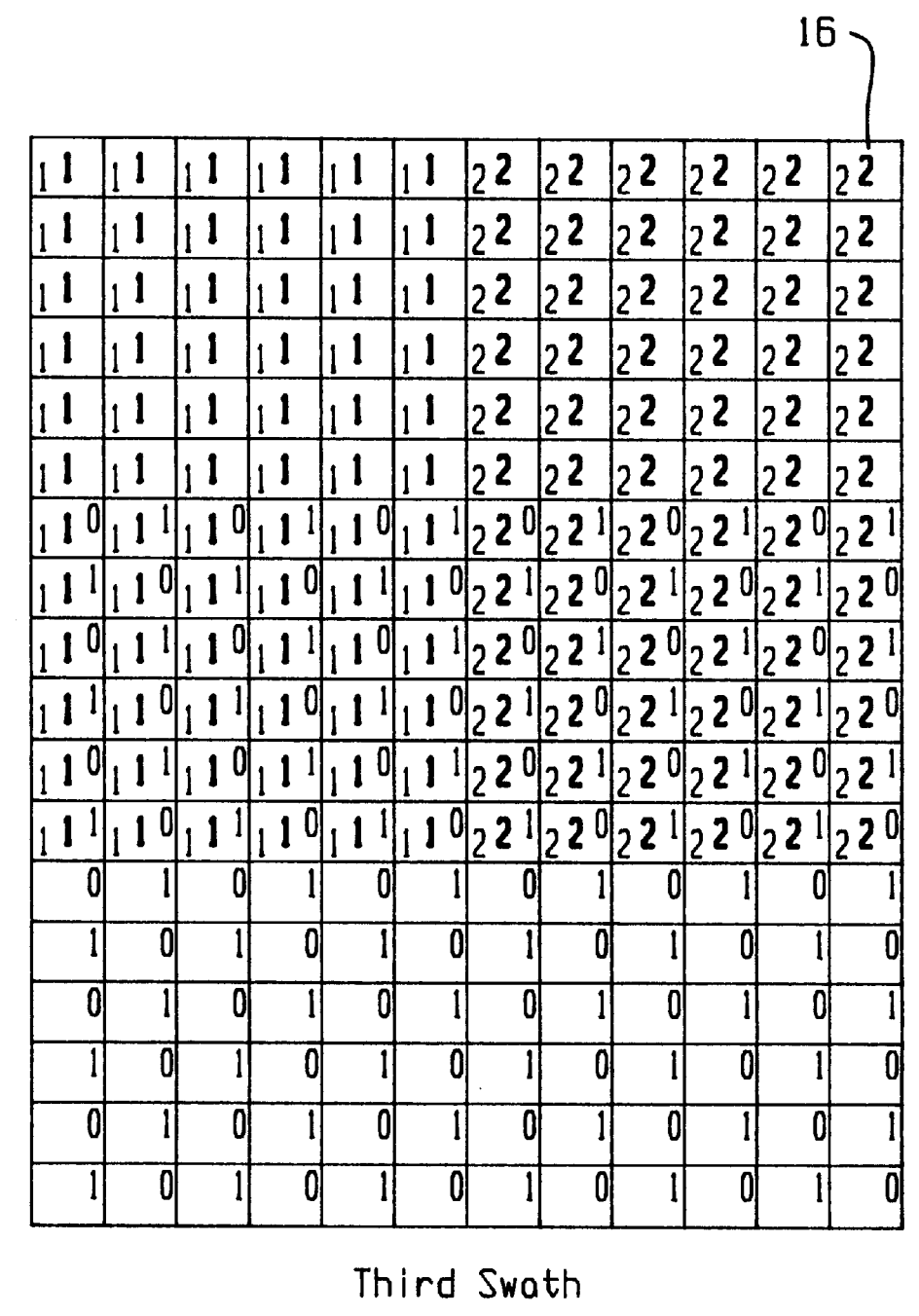

The present invention includes a method of enabling shingled printing with a printer that places multiple ink drops at a single pixel location. Such a printer may jet ink onto a print medium with a resolution of greater than 600 dots per inch. An example shingle algorithm using two-pass shingling and a maximum of two drops per pel is shown in FIGS. 4A through 4C. The maximum number of drops required at any pel location determines the minimum number of required passes. Since the maximum number of layers required is two, a minimum of two shingle passes are required. However, it is possible and may be desirable to take more than two passes.

In order to balance dot usage across the interleaving swaths, dots that are not required to be printed on a given swath are evenly distributed across the remaining swaths. However, if the number of dots required at a pixel location is equal to the number of passes remaining for that pixel location, then a dot must be printed at that pixel location.

For multi-dot shingling, the bitmap, such as bitmap 10, is no longer binary. It must be encoded with the desired number of drops at each print location. The overlaid shingle mask is also no longer binary. Shingle masks 12 and 14 are each a separate set of threshold values, with each threshold value being assigned to a respective cell. Each pixel location and its assigned desired number of drops corresponds to one respective cell and to the respective cell's assigned threshold value in each of masks 12 and 14. For example, pixel location 16 corresponds to cells 18 and 20 of masks 12 and 14, respectively.

The numbers in the multi-drop bitnap are compared in magnitude to the corresponding threshold values in masks 12 and 14. If any number in the multi-drop bitmap is greater than the corresponding value in the overlaid shingle mask, then a drop is fired for the current swath. In FIGS. 4A through 4C, the total cumulative number of drops that has been fired after the current swath is indicated by the blank spaces, "1's" and "2's" shown in bold type in the middle of each bitmap location. The numbers in the shingle mask must range between 0 and one less than the number of shingle passes. For example, in the embodiment of FIGS. 4A through 4C, the number of shingle passes is two, and so the threshold values in masks 12 and 14 range between 0 and 1 (2−1).

In the case of two-pass shingling, all pixel locations requiring zero drops are never fired since zero is never greater than the shingle mask threshold values. All locations requiring one drop are only fired if the corresponding mask value is zero. All locations requiring two drops are always fired since one is the greatest value in the mask.

In this configuration, there is always an equal distribution of fired drops on each pass if there is an equal distribution of 1's and 0's in the shingle mask. On the first swath (FIG. 4A), half of the one-drop locations are fired while all of the 2-drop locations are fired. After a ½ head-height index of six nozzles, mask 12 is replaced with its complement, mask 14, so that the unprinted pels from the first pass now correspond to mask values of 0, forcing them to print. After the second swath, all pels in the top six rows have the correct number of drops. The process in continued with ½ head-height paper indexes between swaths.

In the method of the present invention, shingle masks include numbers between 0 and (number of shingle passes−1) inclusive. The maximum number of drops at any pixel location determines the minimum number of required passes. A drop is printed if the number of drops required is greater than the corresponding shingle mask value. The shingle masks are changed or rotated after each index so that after the defined number of shingle passes have been performed, each cell in the shingle mask has contained each possible shingle mask value. This ensures that all desired drops are printed.

Figure 5A:
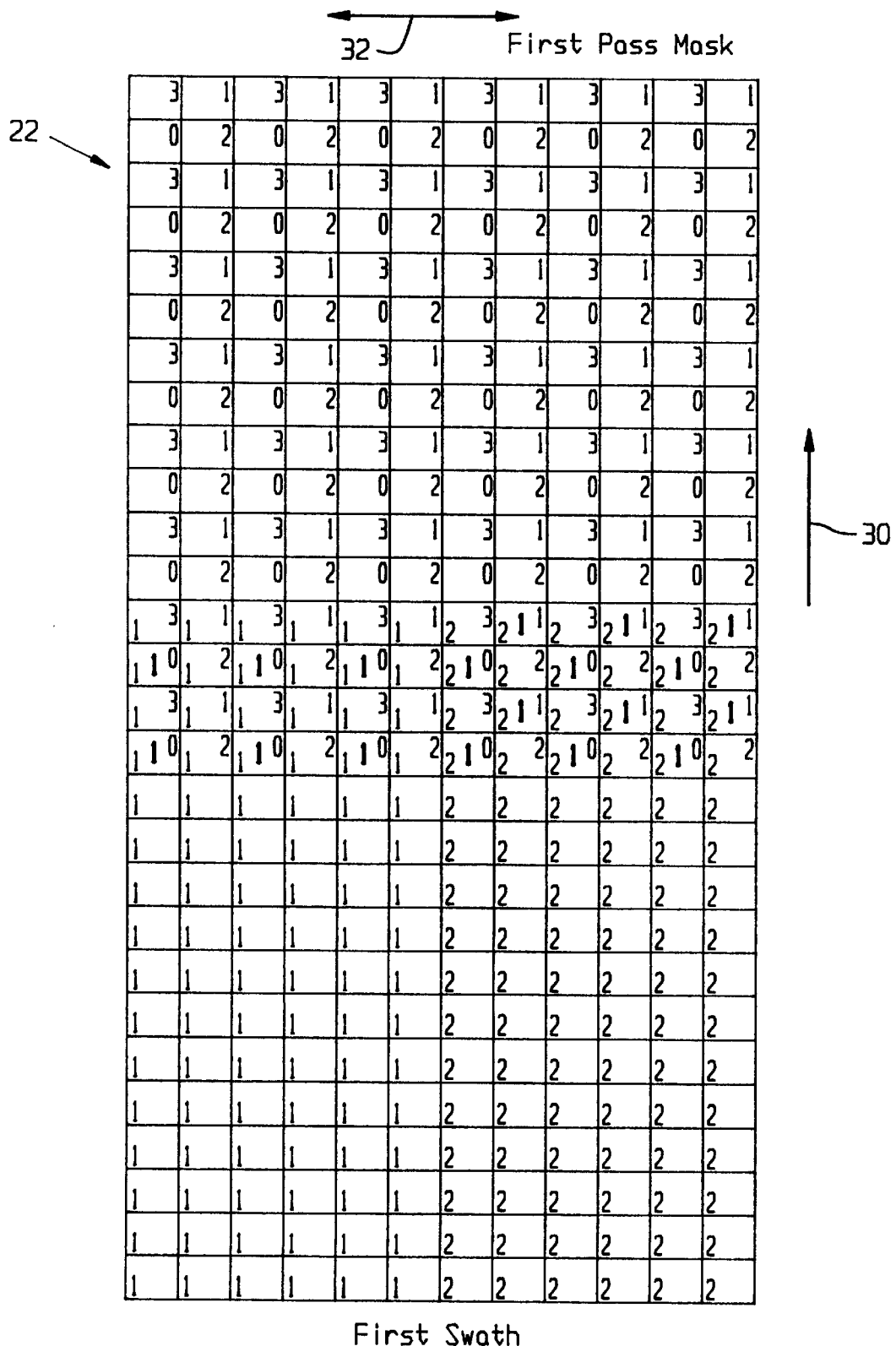
FIG. 5A illustrates a first swath of another embodiment of the printing method of the present invention.
Figure 5B:
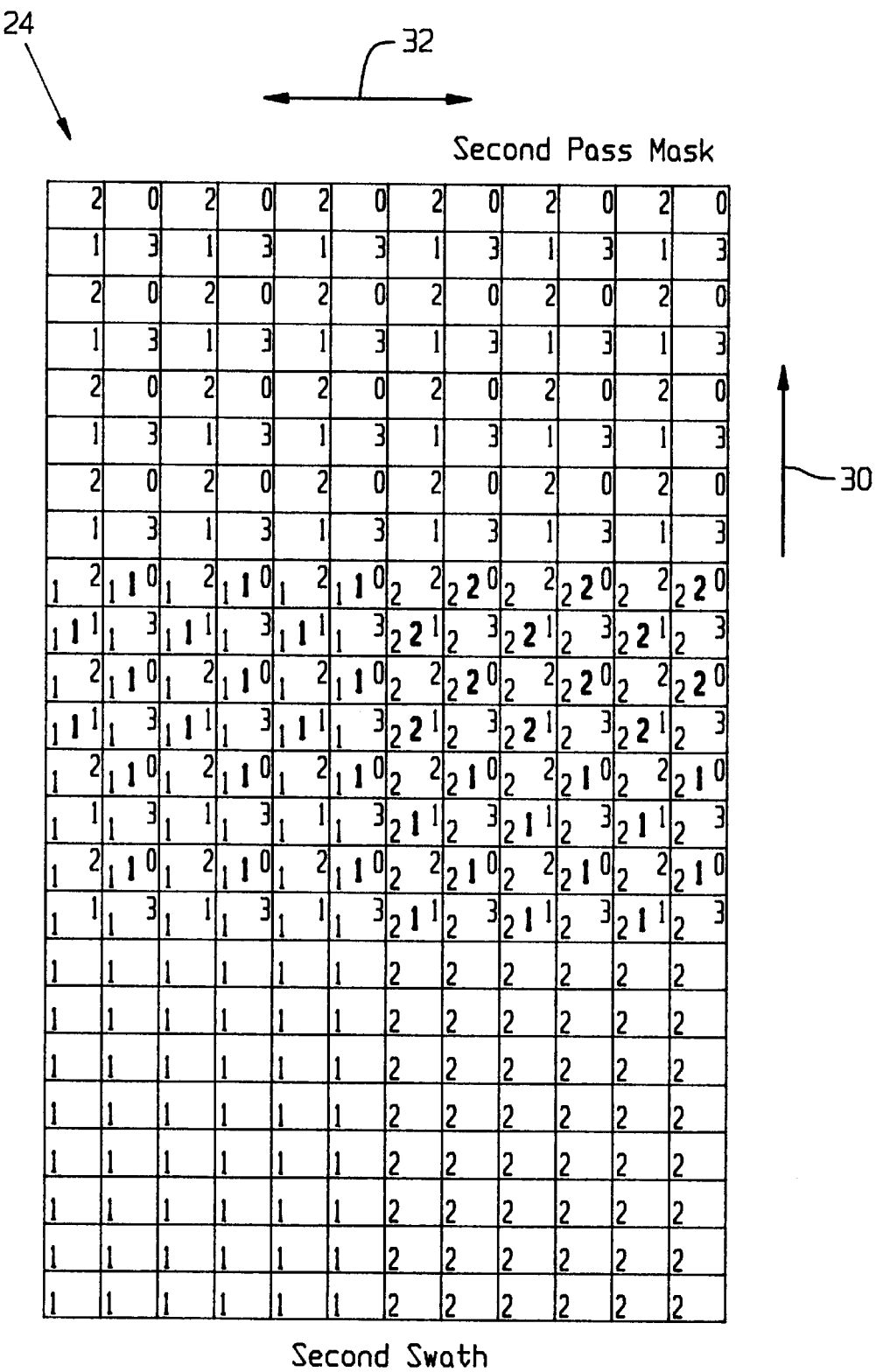
FIG. 5B illustrates a second swath of the printing method of FIG. 5A.
Figure 5C:
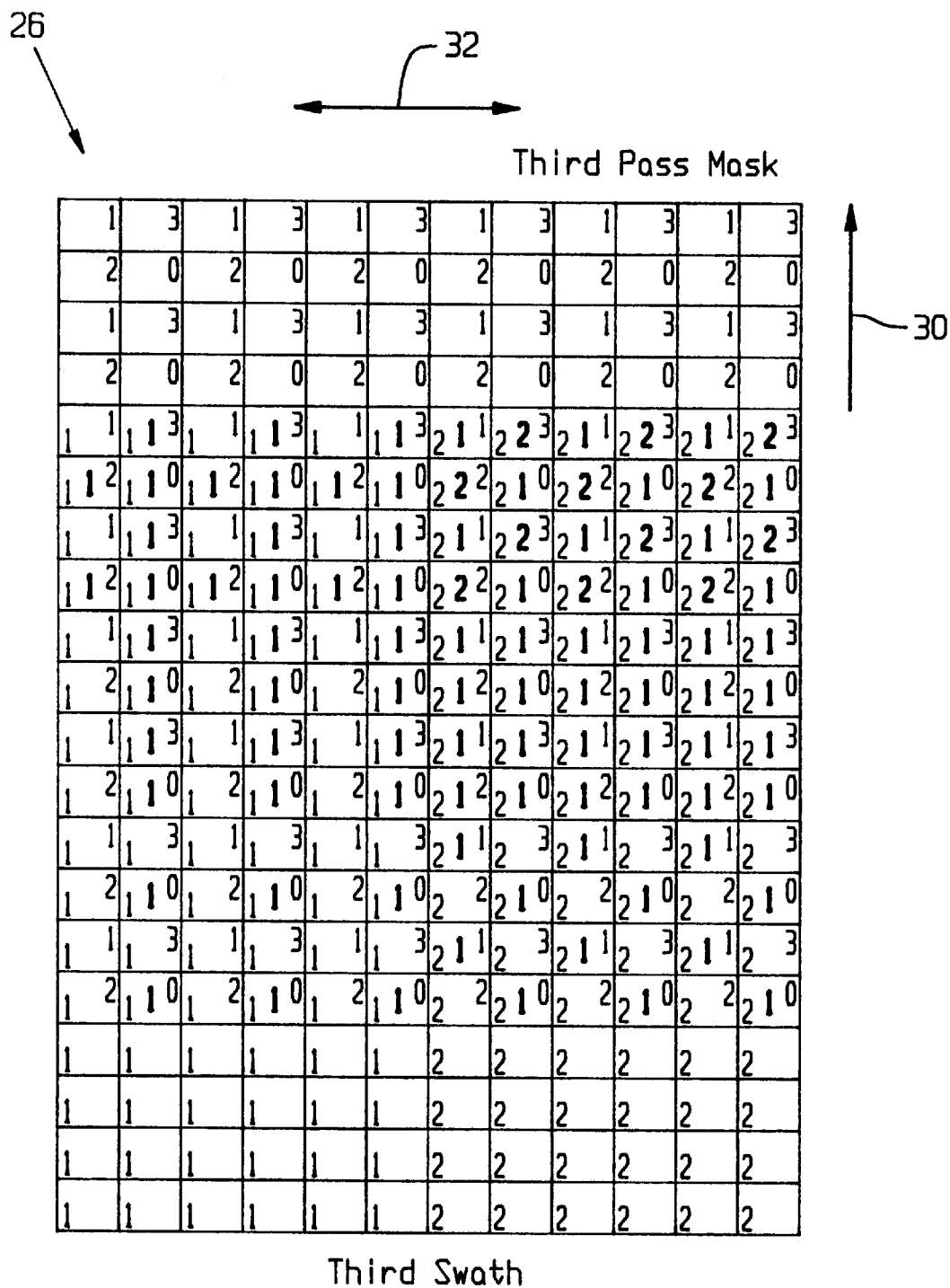
FIG. 5C illustrates a third swath of the printing method of FIG. 5A.
Figure 5D:
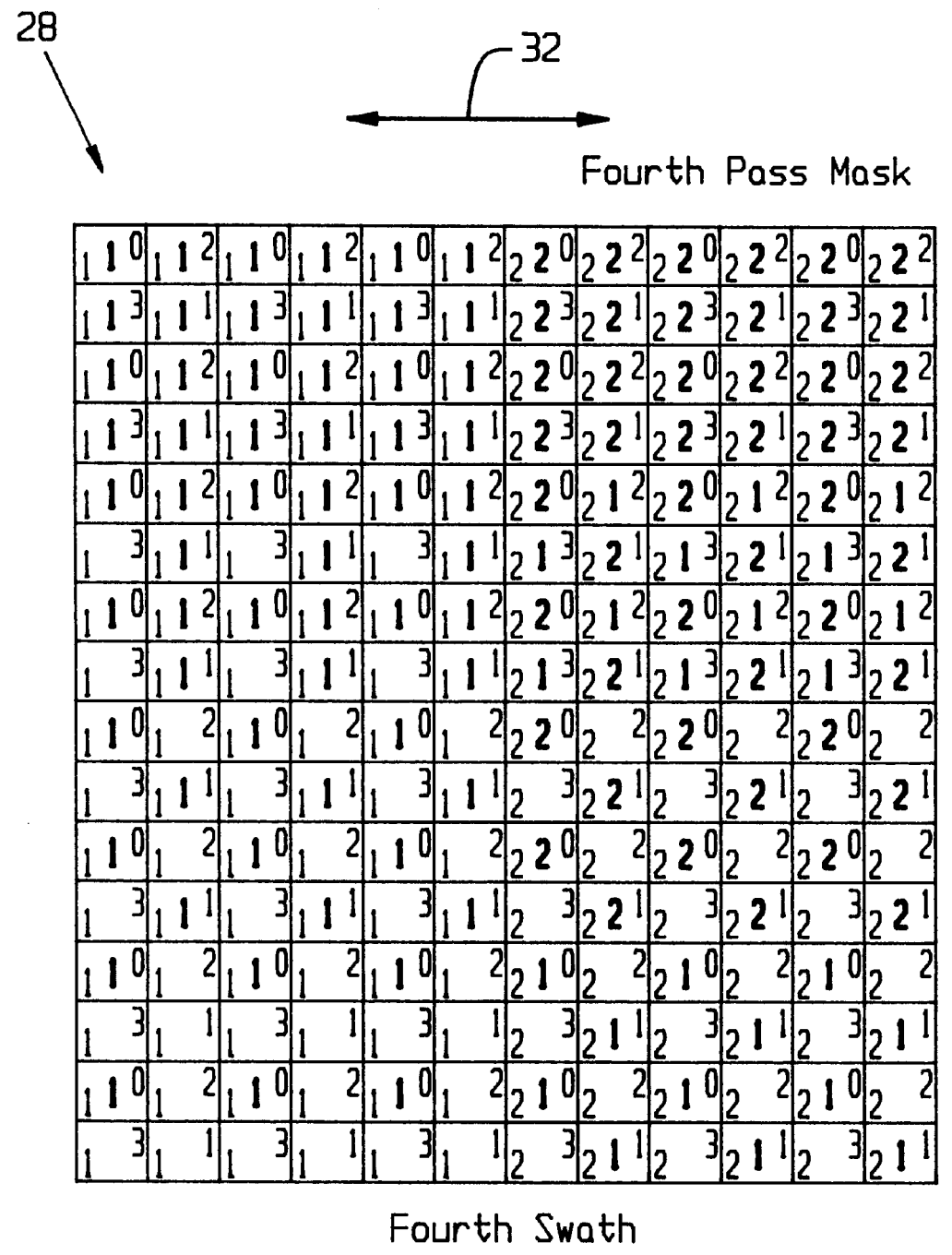

As stated above, the method of the present invention can be extended beyond the two-pass/two-layer example of FIG. 4. An embodiment using four passes and a maximum of two drops per pixel location is shown in FIGS. 5A through 5D. Each of the four shingle masks 22, 24, 26 and 28 is used in one of the four passes and contains an equal number of 0's, 1's, 2's and 3's. Thus, any one of masks 22, 24, 26 and 28 can be created by moving or shifting the assignments of the threshold values from cell to cell in any other existing mask 22, 24, 26 or 28. The print medium, which may be paper, is fed or indexed ¼ head-height (four nozzles) in feed or subscan direction 30 between scans of the printhead in scan directions 32. Each pass prints the appropriate percentage of drops—25% of the one-drop locations and 50% of the two-drop locations. With 4 passes, this produces 100% coverage of the one-drop locations and 200% coverage of the two-drop locations with and equal distribution per swath.

Figure 6A:
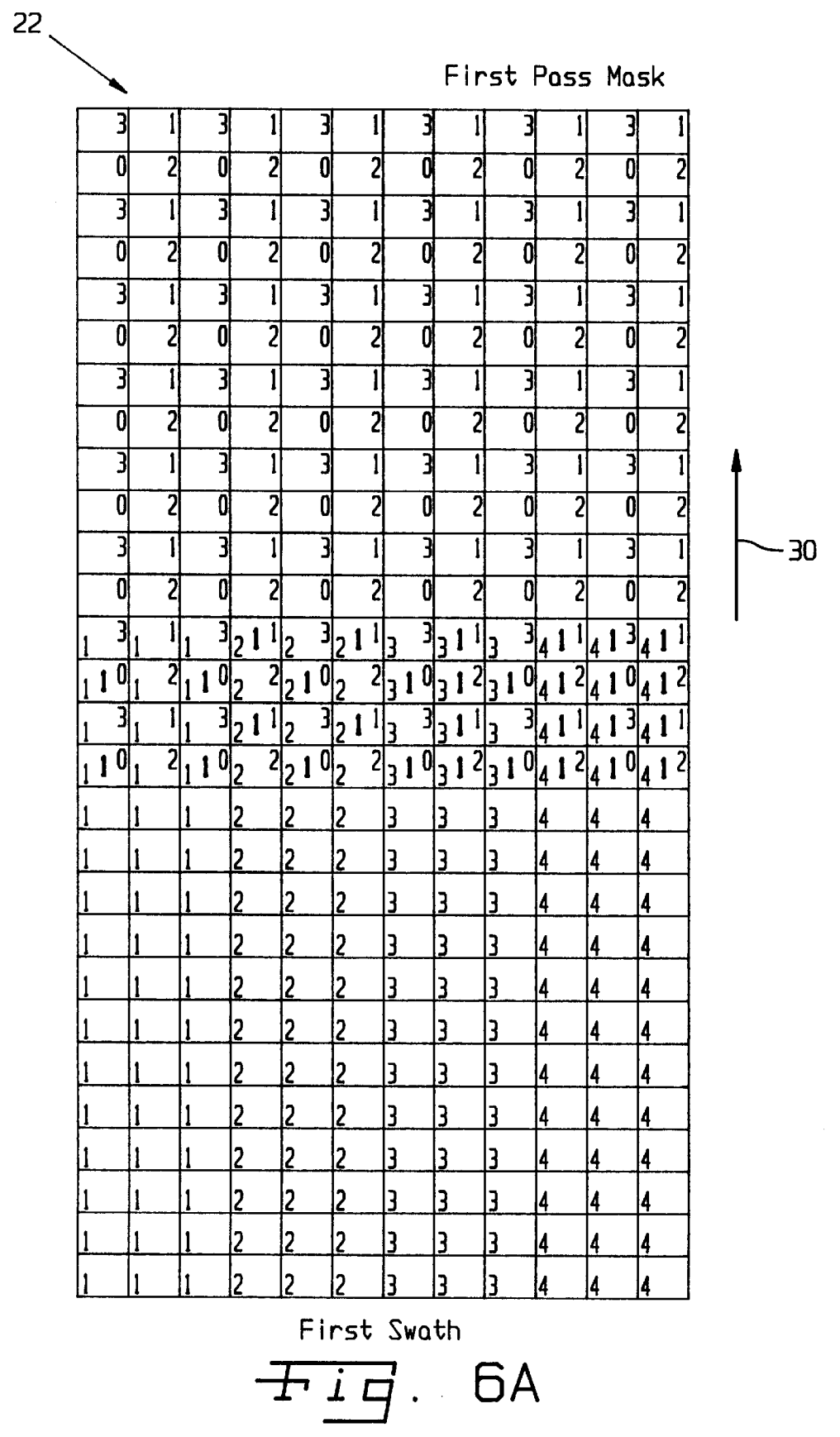
Figure 6B:
FIG. 6B illustrates a second swath of the printing method of FIG. 6A.
Figure 6C:
FIG. 6C illustrates a third swath of the printing method of FIG. 6A.
Figure 6D:
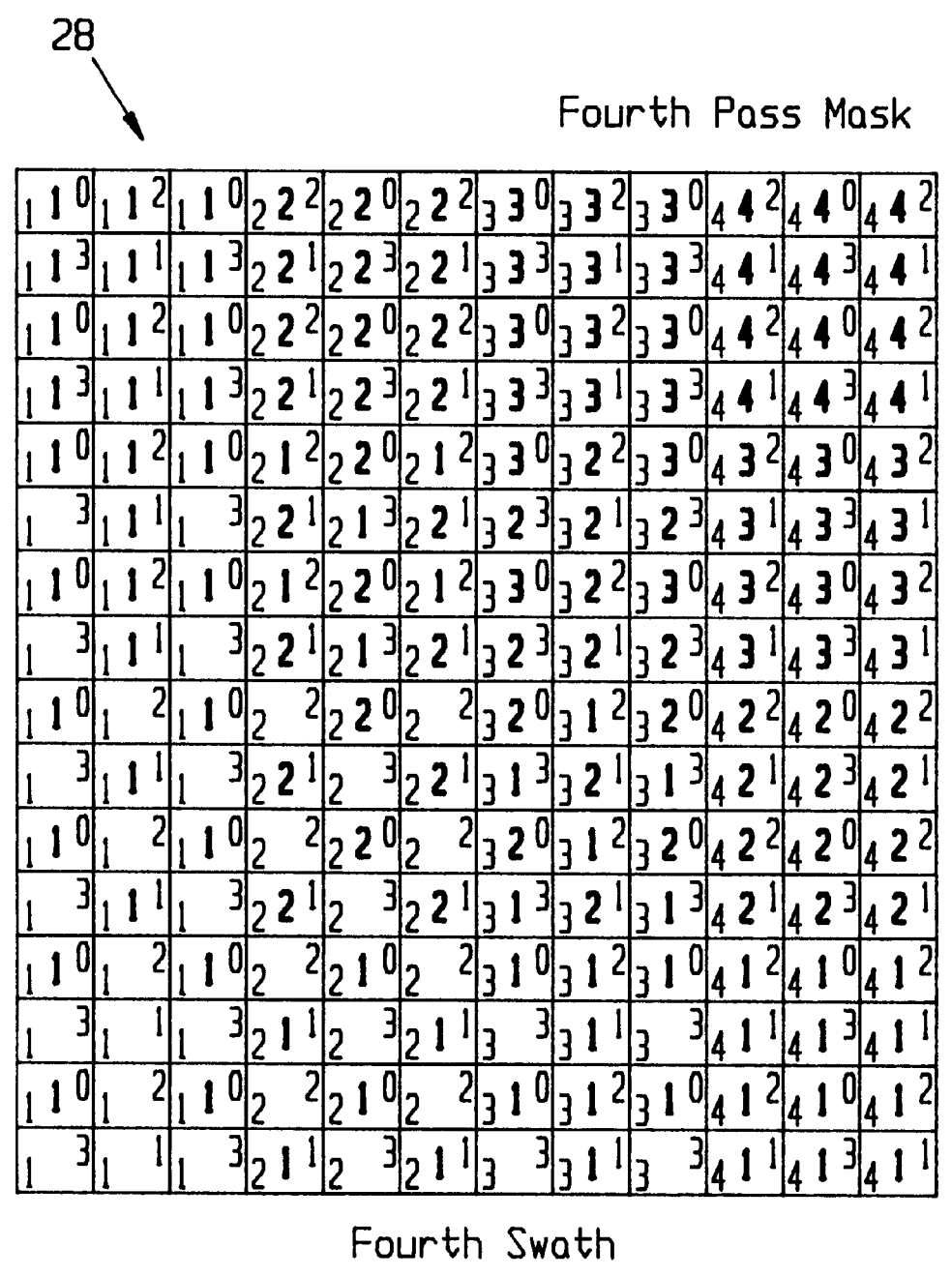

An embodiment using four passes and a maximum of four drops per pixel location is shown in FIGS. 6A through 6D. The same shingle masks 22,24,26 and 28 and indexing feeds in subscan direction 30 are used as in the four pass, two layer embodiment. Again, the paper is indexed head-height (four nozzles) between swaths. Each pass prints substantially the same percentages of drops—25% of the one-drop locations, 50% of the two-drop locations, 75% of the three-drop locations and 100% of the four-drop locations. With four passes, this produces 100% coverage of the one-drop locations, 200% coverage of the two-drop locations, 300% of the three-drop locations and 400% of the four-drop locations, with a substantially equal distribution per swath.

The method of the present invention can be implemented in application specific integrated circuit (ASIC) hardware. Assuming a maximum of three drops per pixel location, a formatter can reserve two bits for specifying the number of drops to be placed at any pixel location. This two-bit value is stored in the bitmap or "Page Map" (PMAP). With a maximum of three drops per location, the shingle mask entries can also be limited to two bits. For each pixel location, the bitmap value or "PMAP value" is compared against the value in the shingle mask using a lookup table (Table 1; FIG. 7), and the corresponding drop is printed if the value in the lookup table is "1". The lookup table performs a "greater than" comparison between the bitmap value and the threshold value as described above.

If the maximum number of drops required at any location is not greater than 3, it is unnecessary to include shingle mask values greater than 3. As described above, the shingle mask values could range from 0 to (number of passes−1). Since any value in the shingle mask that is greater than or equal to the maximum drop-count never results in a fire, it is redundant to include more than one shingle mask value to cover that case. So as an optimization, any shingle mask value that is greater than the maximum drop-count can be replaced with the value for the maximum drop-count. Thus, the lookup table of FIG. 7 can be used with printers that produce up to three drops per pel.

Table 1 performs the "greater than" comparison described above. However, it is to be understood that other forms of the lookup table can also be used. That is, it is not necessary to fill the lookup table exactly as shown in Table 1. In Table 1, a threshold mask value of 3 never allows a pel to be printed, while threshold mask values closer to 0 allow a greater likelihood of a printed pel. In an alternative embodiment, Table 2 (FIG. 8) is used instead of Table 1. In Table 2, the same four functions are supplied by the four threshold shingle mask values, but the mapping of shingle mask values to function has been reversed. This table arrangement is identical in concept to the "greater than" comparison described above. In Table 1, an ink drop is jetted if PMAP>SHINGLE MASK. In Table 2, in contrast, an ink drop is jetted if PMAP>(Maximum Number of Drops−SHINGLE MASK).

The threshold values in the masks have been shown herein to be integers or whole numbers. However, it is to be understood that the threshold values in the masks can also have fractional parts. Further, the fractional parts may or may not be duplicated in other cells in the mask or in the cells of other masks.

The bitmap values have been shown herein as being compared in magnitude to the values in the threshold masks. However, other mathematical relationships between the bitmap values and the threshold values may be determined in deciding whether an ink drop should be jetted at a particular pixel location.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of performing interlace printing on a print medium with a printhead of an ink jet printer, said method comprising the steps of:

providing an array of pixel locations on the print medium, each said pixel location being surrounded by between three and eight surrounding pixel locations, each said pixel location, having a common maximum number M of ink drops that said pixel location may receive;

for each said pixel location, assigning a respective desired number D of ink drops which are to be placed at said pixel location, each said desired number D being one of less than and equal to M;

creating N sets of threshold values, N being one of equal to and greater than M, each of said pixel locations corresponding to one of said threshold values of each said set of threshold values, integer portions of each pair of said threshold values of a same said set that correspond to respective ones of a selected said pixel location and a selected said surrounding pixel location being unequal;

selectively jetting a respective, single ink drop at each said pixel location, whether said single ink drop is jetted onto a respective said pixel location being dependent upon said desired number D assigned to said respective pixel location and said corresponding threshold value of one of said sets of threshold values; and repeating said selectively jetting step N–1 additional times, each said selectively jetting step using a different one of said sets of threshold values.

2. The method of claim 1, wherein said M is greater than 1.

3. The method of claim 1, wherein said selectively jetting steps result in said respective desired number D of ink drops being jetted onto each respective said pixel location.

4. The method of claim 3, wherein said single ink drop is jetted onto said respective pixel location only if said desired number D assigned to said respective pixel location is greater than said corresponding threshold value.

5. The method of claim 4, wherein each said desired number D is greater than a first number of said N corresponding threshold values of said N sets of threshold values, said first number being equal to said desired number D, said desired number D being one of equal to and less than a second number of said N corresponding threshold values of said N sets of threshold values, said second number being equal to N–D.

6. The method of claim 4, wherein said threshold values within each said set of threshold values range from less than 1 to one of greater than and equal to N–1.

7. The method of claim 4, wherein integer portions of said threshold values in each said set of threshold values include 0, N–1, and each integer therebetween.

8. The method of claim 4, wherein integer portions of said N threshold values that correspond to a same said pixel location include 0, N–1, and each integer therebetween.

9. The method of claim 1, wherein an approximately equal number of said ink drops are jetted in each of said N selectively jetting steps.

10. The method of claim 1, wherein said selectively jetting step includes passing the printhead in a scan direction across the print medium.

11. The method of claim 10, wherein said repeating step includes feeding the print medium in a subscan direction substantially perpendicular to said scan direction before again passing the printhead in said scan direction across the print medium.

12. The method of claim 10, wherein said pixel locations are aligned in at least one row in said scan direction.

13. A method of performing interlace printing on a print medium with a printhead of an ink jet printer, said method comprising the steps of:

providing an array of pixel locations on the print medium, each said pixel location having a common maximum number M of ink drops that said pixel location may receive;

for each said pixel location, assigning a respective desired number D of ink drops which are to be placed at said pixel location, each said desired number D being one of less than and equal to M;

creating N sets of threshold values N being one of equal to and greater than M, each of said pixel locations corresponding to one of said threshold values of each said set of threshold values, each said set of threshold values including an array of cells, each of said cells corresponding to one of said pixel locations and being assigned one of said threshold values, said creating step including moving said assignment of each said threshold value from one said cell to an adjacent said cell to thereby create an additional said set of threshold values;

selectively jetting a respective, single ink drop at each said pixel location, whether said single ink drop is jetted onto a respective said pixel location being dependent upon said desired number D assigned to said respective pixel location and said corresponding threshold value of one of said sets of threshold values; and repeating said selectively jetting step N–1 additional times, each said selectively jetting step using a different one of said sets of threshold values.

14. The method of claim 13, wherein said creating step includes repeating said moving step for each remaining said set of threshold values to be created.

15. A method of performing interlace printing on a print medium with a printhead of an ink jet printer, said method comprising the steps of:

providing an array of pixel locations on the print medium, each said pixel location having a common maximum number M of ink drops that said pixel location may receive;

for each said pixel location, assigning a respective desired number D of ink drops which are to be placed at said pixel location, each said desired number D being one of less than and equal to M;

creating N sets of threshold values, N being one of equal to and greater than M, each of said pixel locations corresponding to one of said threshold values of each said set of threshold values, each said set of threshold values including an array of cells, each of said cells corresponding to one of said pixel locations and being assigned one of said threshold values, said creating step including swapping said assignment of each said threshold value of each said cell with said assignment of a surrounding said cell to thereby create an additional said set of threshold values;

selectively jetting a respective, single ink drop at each said pixel location, whether said single ink drop is jetted onto a respective said pixel location being dependent upon said desired number D assigned to said respective pixel location and said corresponding threshold value of one of said sets of threshold values; and repeating said selectively jetting step N–1 additional times, each said selectively jetting step using a different one of said sets of threshold values.

16. The method of claim 15, wherein said jetting is performed with a resolution of greater than 600 dots per inch.

* * * * *